(No Model.)
A. HAMLIN.
CHURN.
No. 245,163. Patented Aug. 2, 1881.
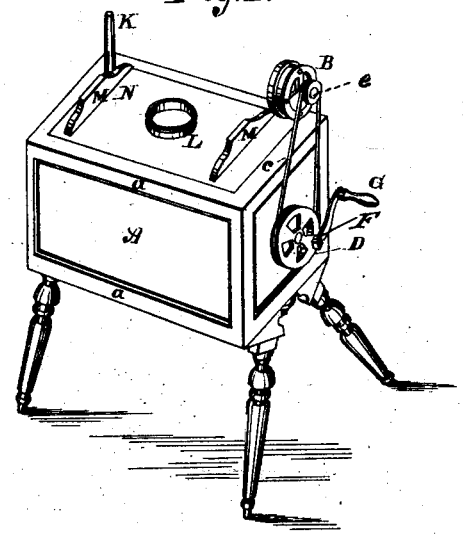
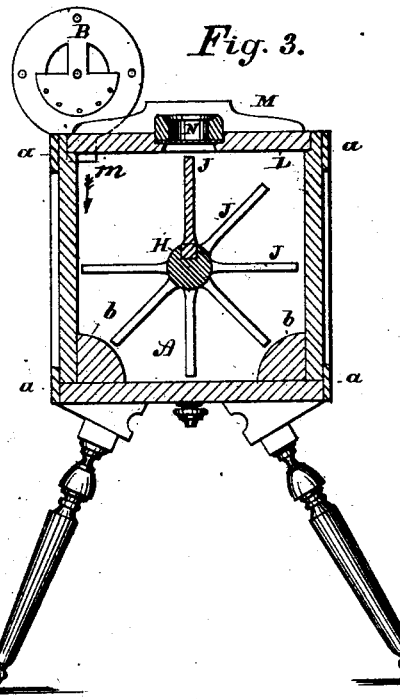
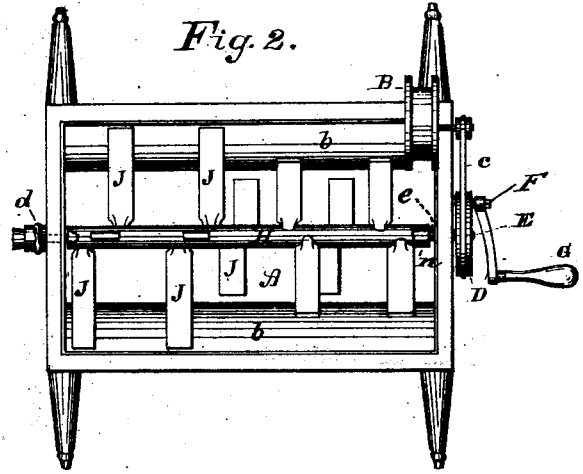
WITNESSES
Fred. G. Dieterich
Herm. Lauten
By his Attorneys
Louis Bagger & Co.
INVENTOR
Alpheus Hamlin
N. PETERS, Photo-Lithographer, Washington, D. C.

UNITED STATES PATENT OFFICE.

ALPHEUS HAMLIN, OF ALMONTE, ONTARIO, CANADA, ASSIGNOR OF ONE-HALF TO CHARLES P. HOLMES, OF GOUVERNEUR, NEW YORK.

CHURN.

SPECIFICATION forming part of Letters Patent No. 245,163, dated August 2, 1881.

Application filed March 7, 1881. (No model.)

*To all whom it may concern:*

Be it known that I, ALPHEUS HAMLIN, of Almonte, in the Province of Ontario and Dominion of Canada, have invented certain new and useful Improvements in Churns; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved churn. Fig. 2 is a top view with the cover removed, and Fig. 3 is a transverse vertical section.

Corresponding parts in the several figures are denoted by like letters of reference.

This invention has relation to aerating churns; and it consists in the improvements hereinafter more fully described, and particularly pointed out in the claim.

In the drawings hereto annexed, A is the cream-chamber, constructed of wood, jointed to form a rectangular box of any desired length, the ends square in dimension and properly nailed and cemented. Over the joints externally are placed battens $a$ $a$, which form sunk panels and prevent leakage by breaking joints. $b$ are quarter-round fillets, secured to the lower corners of the box A, and projecting to the arc of a true circle struck from the center of the box tangentially with the sides. These fillets prevent leakage and give strength to the box, and also act as a resistance to the cream in churning, working, and salting the butter, so that no deposits of cream will remain unchurned.

B is a rotary fan, secured to the box A at one corner above the cover, which discharges air downwardly into the cream-chamber, thereby preventing the cream from entering the mouth $m$ of the fan, which is operated by a band, $c$, from the driving-wheel D. On one of the radial spokes of wheel D is formed a solid square projection, F, on which fits the socket of a crank-handle, G, which can be adjusted to give increased or diminished leverage, according to the speed and power required to drive the dasher-shaft, by placing the socket on the projection, so that the handle will be at a greater or less distance from the center of the wheel.

The dasher-shaft is provided at one end with a sunk bushing, $n$, which fits on the inner end, $e$, of the shaft E of the driving-wheel, and the other end is provided with an inserted bushing to receive the conical point of a thumb-screw, $d$, passing through the opposite end of the box A, so that by releasing the screw the dasher-shaft can be removed. A very small surface of iron is brought into contact with the cream, and injury thereby is prevented.

The dasher J is arranged on the shaft H radially and in spiral form. Each dasher is flat and broad, and one overlaps the other in line of circumvolution. By these dashers the cream is partially thrown back to the opposite side of the churn, and a vacuum thereby formed, which is filled with pure air from the fan, the air passing through the cream, and, after absorbing the deleterious gases and oxidizing the cream, passes out of the cream-chamber through the the vertical pipe K in the cover L. This exit-pipe is of a conical or tapering shape, contracted at its upper end, the object of which is to prevent the cream from spurting through it, inasmuch as any cream which may be thrown into the tube by the operation of the air-blast and dasher combined will stick to the sides of the contracted tube and gradually drop back into the churn.

M are slats across the top of the cover to prevent warping, and also serve as handles to remove the cover, and N is a glass aperture in the cover to admit light for observance.

I am aware that churns have been made with triangular or stepped fillets in the bottom; but these do not operate in like manner as, and are not an equivalent for, my quarter-round or convex fillets $b$ $b$, which, besides strengthening the churn, preventing leakage, and assisting materially in breaking and working the cream, as hereinbefore set forth, operate to roll the butter into a hard and compact form in the process of washing and salting, instead of being carried around by the dasher, nor will the butter adhere to the corners or any other part of the bottom of the churn.

Having thus described my invention, I claim and desire to secure by Letters Patent of the United States—

In a rotary churn, a rectangular cream-box, A, having square corners, which said corners are provided with quarter-round fillets $b\ b$, projecting to the arc of a true circle from the sides and bottom of the churn-box, as shown and set forth.

In testimony that I claim the foregoing as my own I have hereto affixed my signature in presence of two witnesses.

ALPHEUS HAMLIN.

Witnesses:
GEORGE BARTON,
GEO. S. BROWN.